Jan. 18, 1927. 1,615,080
W. C. GRUNOW
WEATHER SHIELD AND GLARE VISOR FOR VEHICLES
Filed May 5, 1923 2 Sheets-Sheet 1

Inventor
William C. Grunow
By George E. Mueller Atty.

Jan. 18, 1927.
W. C. GRUNOW
1,615,080
WEATHER SHIELD AND GLARE VISOR FOR VEHICLES
Filed May 5, 1923    2 Sheets-Sheet 2
Fig. 3.
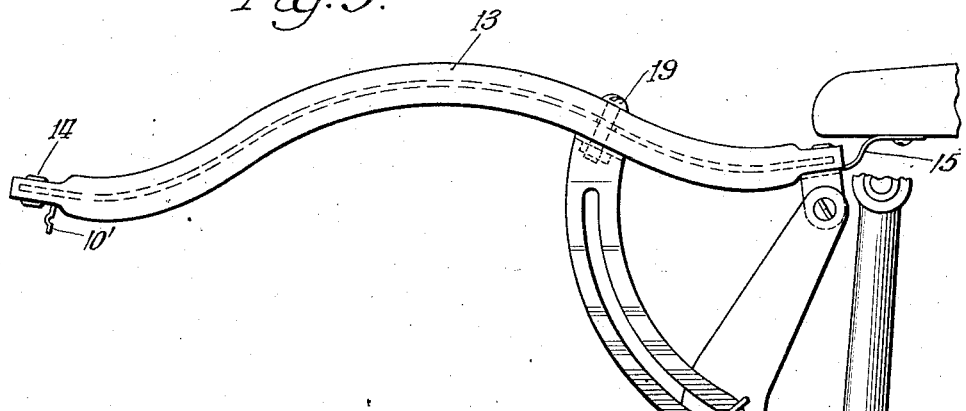
Fig. 4.
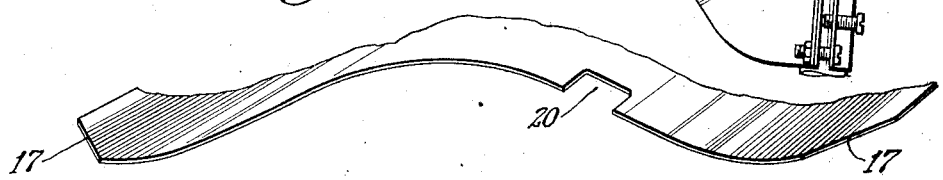
Fig. 5.    Fig. 6.
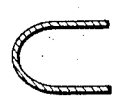 
Fig. 7.
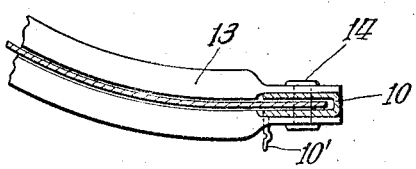
Inventor.
William C. Grunow.
By George E. Mueller Atty.

Patented Jan. 18, 1927.

1,615,080

UNITED STATES PATENT OFFICE.

WILLIAM C. GRUNOW, OF CHICAGO, ILLINOIS, ASSIGNOR TO GRIGSBY-GRUNOW-HINDS CO., OF CHICAGO, ILLINOIS, A CORPORATION OF ILLINOIS.

WEATHER SHIELD AND GLARE VISOR FOR VEHICLES.

Application filed May 5, 1923. Serial No. 636,972.

My invention relates to weather shield and glare visors for vehicles, and has to do more particularly with that type of visor adapted to be placed in front of the automobile windshield at the top thereof and positioned to protect the windshield and also shield the driver's eyes from the glaring rays of the sun, approaching lights, etc. The general object of my invention is to provide an improved structure of the above character, and more particularly over that of the application for weather shield and glare visor, Serial No. 600,702, filed November 13, 1922.

In the manufacture of devices of the above character, it is of course most desirable that they be light in weight, rigid, attractive in appearance and design, readily applied and easily adjusted, and effective in use. To this end I preferably employ an aluminum frame and have provided certain improvements, which will be hereinafter pointed out and claimed. I also preferably employ a sheeting of translucent, elastic material, using a substance with a pyroxlyin base, pyralin being very suitable and the preferred material used. This substance is, of course, comparatively thin, and when used in a visor is subject to hard wear from wind pressure, blows and exposure to varying weather conditions. A great difficulty has been found in constructing a visor of the above character using this kind of sheeting so as to stand up under these various conditions, and so that the sheeting will resume and retain its normal shape and curvature when pressed out of its normal plane, as stated above.

One of the features of my present invention is the provision of a visor having its sheeting supported by the marginal frame, so that it will be unrestricted and freely slidable from expansion or contraction or when distorted from its normal plane from pressure or by a blow. To this end I preferably employ what I term a full-floating pane, that is a pane or sheeting supported in the marginal frame in such a way that it is freely slidable and may readily return to its normal plane, and at the same time permit free movement from weather exposure so as not to warp or wrinkle.

For a better understanding of my invention, reference is to be had to the accompanying drawings, in which—

Figure 1:
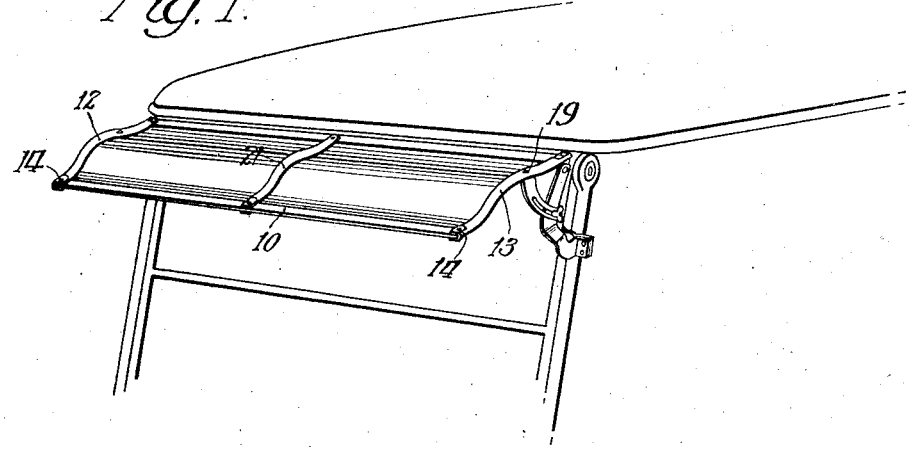
Fig. 1 is a perspective view showing my improved frame mounted on an automobile.
Figure 2:
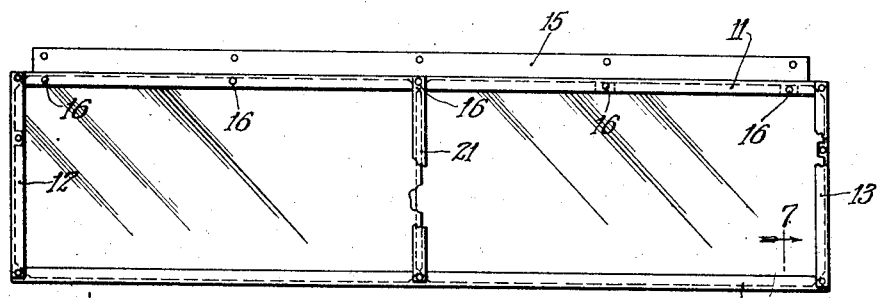
Fig. 2 is a top plan view of the visor body of Fig. 1.

Fig. 2<sup>A</sup> is a view of one of the panes or sheets, showing how it is blanked out or notched so as to readily clear all of the binding screws or rivets which go through the frame to hold it together;

Fig. 3 is an enlarged side or end view, showing the preferred method of mounting the visor;

Fig. 4 is a perspective view of the end of the sheeting, showing how it is pre-formed before placing it in the frame;

Fig. 5 shows the first step in the method of forming up my improved tubular end sections of the frame;

Fig. 6 shows the tubular end section as finally formed; and

Fig. 7 is an enlarged view of an end portion of an end section, showing the method of fastening the same to the longitudinal sides of the frame.

Referring now more in detail to my improved construction, as illustrated I provide a marginal frame preferably made of aluminum and including front and rear sections 10—11, respectively, which are in the nature of channelled sides, as shown more clearly in Fig. 7. A down turned web is provided on each front and rear section, so as to give added strength, this web being indicated at 10' in Fig. 7. For the end sections of the frame I employ an improved tubular construction formed from sheet aluminum. To this end I take a blank of the proper contour and draw it transversely, as shown in Fig. 5, and then draw the sides together as indicated in Fig. 6, so as to leave a slot in the inner side extending into the tube so as to provide a channel for supporting the visor sheeting. These end sections are preferably longitudinally curved, so as to provide a transverse curvature to the visor, and I preferably use a triple curve structure of the general character employed in the application heretofore referred to, but featured by a curvature which gives a greater strength to the pane and affords greater elasticity. To this end the center arch is of a greater and more abrupt curvature relative to the two minor adjacent curves into which the center arch extends, thus providing greater compensating curvature to take care of the expansion and contraction of the sheeting, or distortion from pressure or a blow.

The tubular end sections 12—13 having been given the proper longitudinal curvature, are also flattened at their ends so as to embrace the front and rear sections 10—11, the parts being then secured together, preferably by rivets 14.

With the marginal frame thus assembled and secured at its meeting corners by rivets, the frame itself has a limited pivotal collapsing movement because of the fact that the parts cannot be secured together tight enough to prevent such movement. But due to the channel supporting construction for the sheeting, although preferably full-floating, it is such that the sheeting, although free to slide to a limited degree in the frame, prevents this pivotal collapsing movement of the frame. This is by reason of the fact that the edges of the sheeting extend into the channels sufficiently to limit this movement of the frame to practically nothing.

Figure 2A:
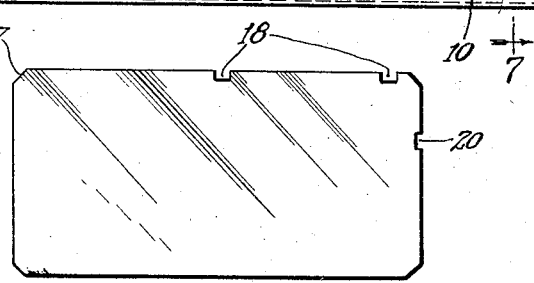

To further strengthen the frame I preferably employ a steel reinforced weather strip 15 of the kind heretofore employed, this being secured along the rear section 11 by rivets 16. These rivets 16 pass through the channel portions of the rear section 11, but the sheeting is notched or cut away to clear the rivets, as indicated in Fig. 2A. To this end the corners 17 are cut away and notches 18 cut along the edge of the sheet to clear the rivets. The visor body may be supported by any desirable bracket construction, and I have shown one form for the purpose of illustration in which the adjustable arm thereof is secured to the body by clamping screws 19 passing through the end tubular sections. But the sheeting is notched at 20 as indicated in Fig. 3, to clear the screws 19 so as not to prevent its free sliding movement.

In the preferred frame construction I divide it into sections, preferably two, with a single intermediate cross bar consisting of upper and lower formed valves 21, preferably pressed out of sheet-metal and of the proper longitudinal curvature. In order to provide a frame which will stand up under adverse weather conditions and at the same time have greater strength, the lower half of the cross piece is made of brass, plated, and the upper half of aluminum. These sections are secured to the front and rear frame sections so as to leave a slot on each side, thereby providing a support for the sheeting in the nature of a channel.

It will thus be seen that in the preferred form of frame construction I have a marginal frame channelled around the inside and in which the sheeting is supported and in such a way that the sheeting is absolutely free to slide in the frame, preferably by what I term a full-floating support. And to this end I preferably arrange the supporting channels so that the sheeting is not bound therein at any point, thus allowing the greatest freedom of movement.

Now as to the sheeting, I preferably employ a translucent elastic material, preferably pyralin as this has given very excellent results. This sheeting is preferably preformed to substantially the same curvature as the visor body. To this end I preferably take the straight blank sheets, place them between metal forms of a curvature conforming substantially to that of the visor body, and then immerse the form with its sheeting held therein in water hot enough to sufficienly soften the sheeting so that it will conform to the shape of the mold, but the water must not be hot enough to burn the sheeting. Water at about 200 degrees Fahrenheit works quite well.

I then immerse the heated mold with its clamped sheeting therein in water sufficiently cool to set the pyralin so that it will inherently retain its curvature substantially the same as that of the visor body.

This sheeing is of course placed in the frame before it is riveted together, inserting the edges of the sheeting in the channels of the frame sides, and then riveting the parts together, also securing the center brace 21 in place with the two sheets preferably overlapping at this point, as indicated in Fig. 2.

While I have shown a particular form or construction of body frame, and also a particular transverse curvature, I contemplate employing other arrangements than that shown, and I appreciate that changes will readily occur to those skilled in the art and therefore I do not desire to be limited to the exact structure shown and described, but aim to cover all that which comes within the spirit and scope of the appended claim.

What I claim as new and desire to secure by United States Letters Patent is:

In a weather shield and glare visor of the character described, a visor body comprising a transversely curved marginal frame including a front, a rear, two end, and an intermediate cross bar, each having an inside channel forming two channelled frames, the front, rear and end sections being formed with top and bottom portions rigidly connected and channeled toward the inside with the outer edge closed, and a translucent stiff elastic sheeting supported full-floating in the channels of each frame and meeting at the center cross bar so as to permit relative movement thereof.

In witness whereof, I hereunto subscribe my name this 28th day of March, A. D. 1923.

WM. C. GRUNOW.